(12) United States Patent
Fujiwara et al.

(10) Patent No.: US 11,322,960 B2
(45) Date of Patent: May 3, 2022

(54) BATTERY SYSTEM, VEHICLE, AND METHOD FOR CONTROLLING CHARGE AND DISCHARGE OF A SECONDARY BATTERY

(71) Applicant: TOYOTA JIDOSHA KABUSHIKI KAISHA, Toyota (JP)

(72) Inventors: Mai Fujiwara, Handa (JP); Ryo Kanada, Toyota (JP); Kenji Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 16/867,028

(22) Filed: May 5, 2020

(65) Prior Publication Data

US 2020/0366111 A1 Nov. 19, 2020

(30) Foreign Application Priority Data

May 16, 2019 (JP) .............................. JP2019-092832

(51) Int. Cl.
| | |
|---|---|
| *H02J 7/00* | (2006.01) |
| *B60L 50/60* | (2019.01) |
| *B60L 58/10* | (2019.01) |
| *H01M 10/42* | (2006.01) |
| *H01M 10/44* | (2006.01) |
| *H01M 10/48* | (2006.01) |

(52) U.S. Cl.
CPC ............ *H02J 7/0047* (2013.01); *B60L 50/66* (2019.02); *B60L 58/10* (2019.02); *H01M 10/425* (2013.01); *H01M 10/44* (2013.01); *H01M 10/48* (2013.01); *H01M 2010/4271* (2013.01); *H01M 2220/20* (2013.01)

(58) Field of Classification Search
CPC ........ H02J 7/0047; B60L 50/66; B60L 58/10; H01M 10/425; H01M 10/44; H01M 10/48; H01M 2010/4271; H01M 2220/20
USPC ........................................................ 320/134
See application file for complete search history.

(56) References Cited

U.S. PATENT DOCUMENTS

| | | | |
|---|---|---|---|
| 2015/0153424 | A1 | 6/2015 | Kanada |
| 2017/0047622 | A1 | 2/2017 | Tashiro et al. |
| 2018/0134173 | A1 | 5/2018 | Takebayashi et al. |

FOREIGN PATENT DOCUMENTS

| | | | |
|---|---|---|---|
| JP | 2010-060406 | A | 3/2010 |
| JP | 2013-046446 | A | 3/2013 |
| JP | 2015-207473 | A | 11/2015 |
| JP | 2015-228324 | A | 12/2015 |
| JP | 2016-058255 | * | 4/2016 |
| JP | 2016-058255 | A | 4/2016 |

(Continued)

*Primary Examiner* — Nathaniel R Pelton
(74) *Attorney, Agent, or Firm* — Sughrue Mion, PLLC

(57) ABSTRACT

A battery system includes a battery pack including a plurality of cells, and an ECU. The ECU calculates a current distribution in each cell using a ladder circuit network model, the ladder circuit network model being obtained by geometrically modeling an interior of the cell using a plurality of resistance elements and a plurality of power storage elements. The ECU calculates the current distribution in the cell by applying, to the ladder circuit network model, a resistance distribution in the cell calculated based on a salt concentration distribution in the cell.

3 Claims, 11 Drawing Sheets

(56) References Cited

FOREIGN PATENT DOCUMENTS

JP    2018-081807 A    5/2018
WO    2013/121466 A1   8/2013

\* cited by examiner

SALT CONCENTRATION DISTRIBUTION

RESISTANCE DISTRIBUTION CAUSED
BY SALT CONCENTRATION UNEVENNESS

BATTERY SYSTEM, VEHICLE, AND METHOD FOR CONTROLLING CHARGE AND DISCHARGE OF A SECONDARY BATTERY

This nonprovisional application is based on Japanese Patent Application No. 2019-092832 filed on May 16, 2019 with the Japan Patent Office, the entire contents of which are hereby incorporated by reference.

BACKGROUND

Field

The present disclosure relates to a battery system including a secondary battery, a vehicle on which the battery system is mounted, and a method for controlling a battery system including a secondary battery.

Description of the Background Art

It is known that charging and discharging of a secondary battery causes an uneven salt concentration distribution (hereinafter, may be referred to as "salt concentration unevenness") in a secondary battery, which leads to a reduction in input and output performance of the secondary battery. The reduction in input and output performance of the secondary battery caused by the salt concentration unevenness will be referred to as "high rate deterioration" or the like in distinction from deterioration over time.

Japanese Patent Laying-Open No. 2018-81807 discloses a battery system capable of suppressing the progress of high rate deterioration of a secondary battery. In the battery system, the high rate deterioration is mitigated by performing prescribed charging and discharging processes (first to third processes), and then, external charging is performed. As a result, the progress of the high rate deterioration caused by performing external charging can be suppressed.

In recent years, as a capacity of a secondary battery (hereinafter, may be simply referred to as "cell") becomes larger, a size of the cell becomes larger. Therefore, even when there is no salt concentration unevenness (high rate deterioration), the cell has an uneven current distribution (hereinafter, may be referred to as "current unevenness") caused by a geometric structure of the cell. Such current unevenness is not particularly taken into consideration in Japanese Patent Laying-Open No. 2018-81807, and thus, there is room for improvement of accuracy in estimating the current distribution in the cell.

SUMMARY

The present disclosure has been made to solve the above-described problem, and an object of the present disclosure is to provide a battery system capable of accurately calculating a current distribution in a secondary battery (cell), a vehicle on which the battery system is mounted, and a method for controlling the battery system.

A battery system and a vehicle according to the present disclosure include: a secondary battery (cell); and a controller that calculates a current distribution in the cell using a circuit network model, the circuit network model being obtained by geometrically modeling an interior of the cell using a plurality of resistance elements and a plurality of power storage elements. The controller calculates the current distribution in the cell by applying, to the circuit network model, a resistance distribution in the cell calculated based on a salt concentration distribution in the cell.

A method for controlling a battery system according to the present disclosure is a method for controlling a battery system including a secondary battery (cell), the method including: calculating a salt concentration distribution in the cell; calculating a resistance distribution in the cell based on the calculated salt concentration distribution; and calculating a current distribution in the cell using a circuit network model, the circuit network model being obtained by geometrically modeling an interior of the cell using a plurality of resistance elements and a plurality of power storage elements. The calculating the current distribution includes calculating the current distribution in the cell using the circuit network model to which the resistance distribution calculated in the calculating the resistance distribution is applied.

In the battery system, the vehicle and the control method described above, the current distribution in the cell is calculated using the above-described circuit network model, and the current distribution caused by a geometric structure of the cell can thereby be calculated. Furthermore, the resistance distribution in the cell calculated based on the salt concentration distribution in the cell is applied to the above-described circuit network model. Therefore, according to the battery system, the vehicle and the control method, the current distribution in the cell can be accurately calculated, with consideration given to the geometric structure of the cell and the salt concentration distribution in the cell.

The controller may execute control of suppressing charging and discharging of the cell, when a magnitude of a current in the cell based on the calculated current distribution exceeds a threshold value.

The method for controlling a battery system may further include executing control of suppressing charging and discharging of the cell, when a magnitude of a current in the cell based on the calculated current distribution exceeds a threshold value.

According to the above-described configuration, a maximum current value in the cell can be accurately estimated based on the calculated current distribution, and thus, charging and discharging can be suppressed without excess or deficiency.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
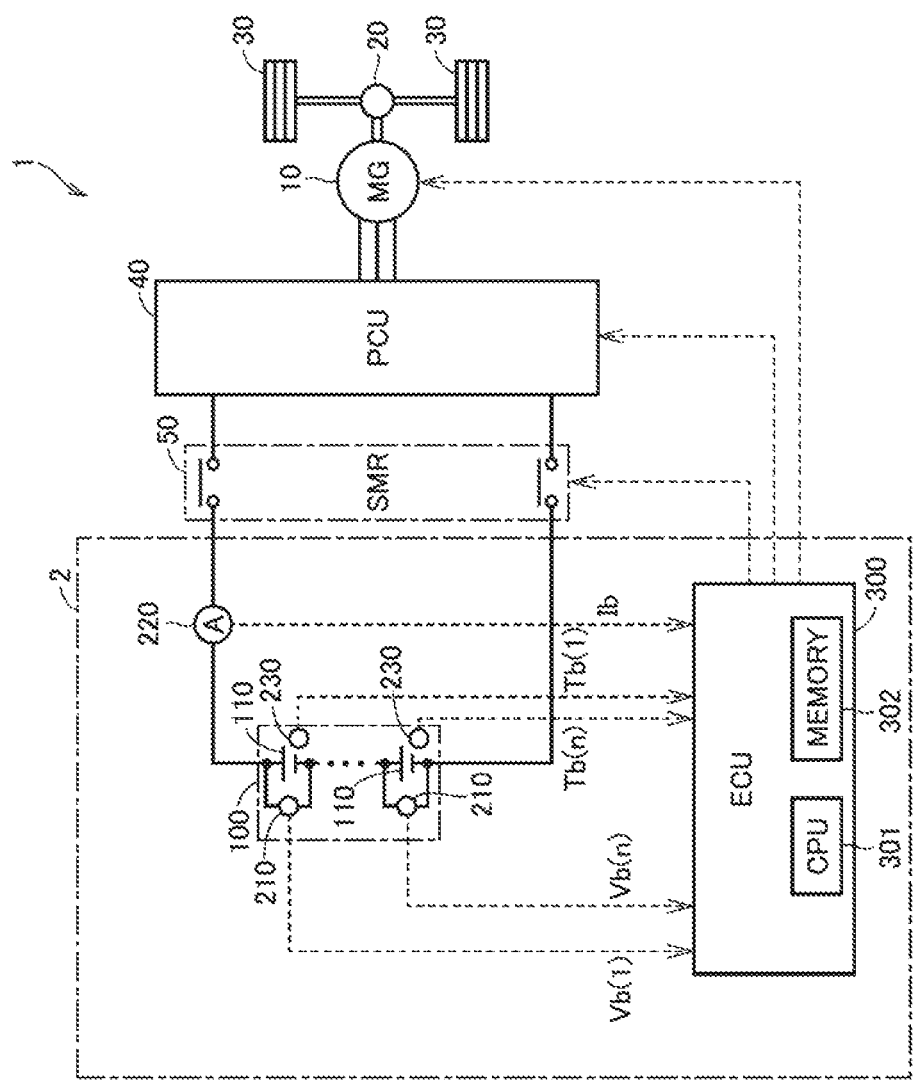
FIG. 1 is an overall configuration diagram of a vehicle on which a battery system according to the present embodiment is mounted.

An embodiment of the present disclosure will be described in detail hereinafter with reference to the drawings, in which the same or corresponding portions are denoted by the same reference characters and description thereof will not be repeated.

<Configuration of Battery System>

FIG. 1 is an overall configuration diagram of a vehicle on which a battery system according to the present embodiment is mounted. Although an electric vehicle including an MG 10 as a motive power source will be representatively described below, the vehicle according to the present disclosure is not necessarily limited to such an electric vehicle. The vehicle according to the present disclosure may be a hybrid vehicle on which an engine is further mounted as a motive power source, or may be a fuel cell vehicle on which a fuel cell is further mounted.

Referring to FIG. 1, a vehicle 1 includes a battery system 2, a motor generator (hereinafter, referred to as "MG") 10, a motive power transmission gear 20, a driving wheel 30, a power control unit (hereinafter, referred to as "PCU") 40, and a system main relay (hereinafter, referred to as "SMR") 50. Battery system 2 includes a battery pack 100, a voltage sensor 210, a current sensor 220, a temperature sensor 230, and an electronic control unit (hereinafter, referred to as "ECU") 300.

MG 10 is a motor generator driven by PCU 40 and is, for example, a three-phase AC synchronous motor including a permanent magnet embedded in a rotor. MG 10 is supplied with electric power from battery pack 100 and rotates a drive shaft. MG 10 can also perform regenerative power generation during braking of vehicle 1. Electric power generated by MG 10 is rectified by PCU 40 and stored in battery pack 100.

PCU 40 converts the electric power stored in battery pack 100 to AC power and supplies the AC power to MG 10 in accordance with a control signal from ECU 300. In addition, PCU 40 rectifies the AC power generated by MG 10 during braking of vehicle 1 and supplies the rectified power to battery pack 100. PCU 40 includes, for example, an inverter that drives MG 10, and a converter that performs voltage conversion between battery pack 100 and the inverter.

Battery pack 100 is a rechargeable power storage element. Battery pack 100 is formed by connecting a plurality of (n) secondary batteries (cells) 110 in series, and each cell 110 is, for example, a lithium ion secondary battery, a nickel metal hydride secondary battery or the like. The lithium ion secondary battery is a secondary battery including lithium as an electric charge carrier, and may include a so-called all-solid-state battery including a solid electrolyte, in addition to a general lithium ion secondary battery including a liquid electrolyte.

Battery pack 100 can supply the stored electric power to MG 10 through PCU 40. In addition, battery pack 100 can receive the electric power generated by MG 10 during deceleration of vehicle 1 through PCU 40 and store the electric power. Although not particularly shown, battery pack 100 can be charged by a power supply external to the vehicle, using a charging device for charging battery pack 100 by the above-described power supply.

SMR 50 is provided between PCU 40 and battery pack 100. SMR 50 performs switching between supply and cutoff of the electric power between PCU 40 and battery pack 100 in accordance with a control signal from ECU 300.

Voltage sensor 210 is provided for each cell 110 and detects a voltage Vb across terminals of each cell 110. Current sensor 220 detects a current Ib input and output to and from battery pack 100. Temperature sensor 230 is provided for each cell 110 and detects a temperature Tb of each cell 110. A detection value of each sensor is output to ECU 300.

ECU 300 includes a CPU (Central Processing Unit) 301, a memory (a ROM (Read Only Memory) and a RAM (Random Access Memory)) 302, and an input and output buffer (not shown). CPU 301 loads a program stored in the ROM into the RAM or the like and executes the program. A process performed by ECU 300 is written on the program stored in the ROM.

<Description of Current Distribution in Cell>

As a capacity of the cell becomes larger, a size of the cell becomes larger. Therefore, the cell has current unevenness caused by a geometric structure of the cell, and in the cell, there are a portion where a relatively large current flows and a portion where a small current flows. Thus, simply by checking an input and an output to and from cell 110 or battery pack 100, the cell cannot in some cases be protected from an overcurrent appropriately.

Accordingly, in the battery system according to the present embodiment, a current distribution in cell 110 is calculated using a circuit network model obtained by modeling a circuit in cell 110 using a plurality of resistance elements and a plurality of power storage elements. As a result, the current distribution in cell 110 caused by the geometric structure of cell 110 can be calculated.

In cell 110, there is salt concentration unevenness (high rate deterioration) due to charging and discharging. Since a larger amount of current flows in a portion having a low salt concentration than in a portion having a high salt concentration, the current distribution in cell 110 is affected not only by the geometric structure of cell 110 but also by a salt concentration distribution occurring in cell 110. Accordingly, in the battery system according to the present embodiment, the salt concentration distribution in cell 110 is calculated and a resistance distribution calculated based on the salt concentration distribution is applied to the above-described circuit network model. As a result, the current distribution in cell 110 can be accurately calculated, with consideration given to the geometric structure of cell 110 and the salt concentration distribution in cell 110.

Hereinafter, the circuit network model of cell 110 will be first described, and then, the current distribution in cell 110 will be described.

Figure 2:
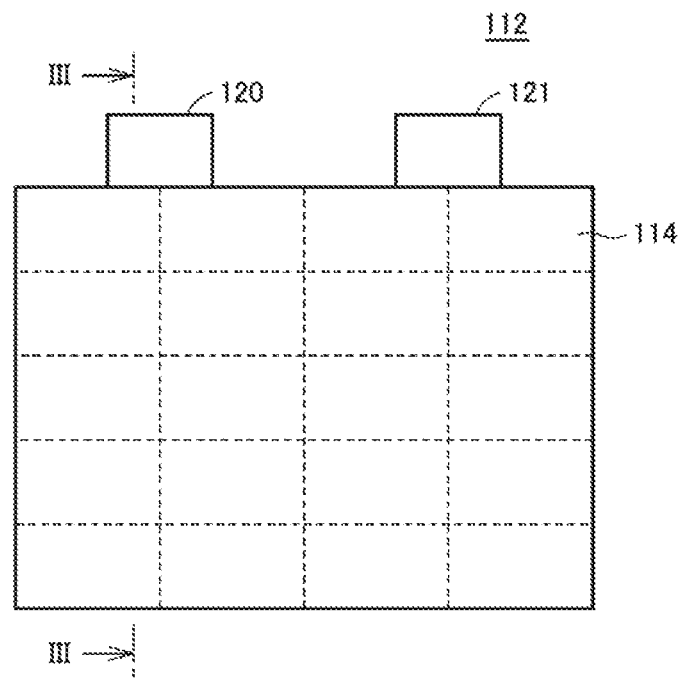
FIG. 2 is a side view showing a configuration example of an electrode assembly of a cell.

FIG. 2 is a side view showing a configuration example of an electrode assembly of cell 110. Referring to FIG. 2, in the present embodiment, an electrode assembly 112 is partitioned into a plurality of portions 114 and a circuit network model (hereinafter, referred to as "ladder circuit network model") obtained by modeling each portion 114 using at least one of resistance elements and power storage elements is set. In this example, electrode assembly 112 is partitioned into 20 portions 114 of 4×5.

Figure 3:
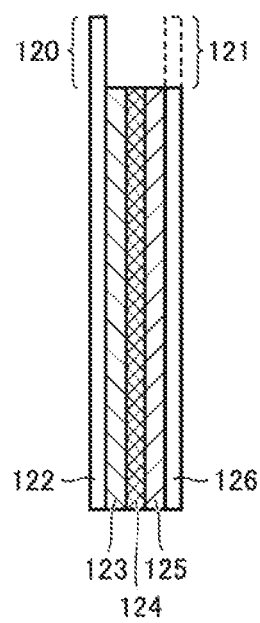
FIG. 3 is a cross-sectional view taken along line in FIG. 2.

FIG. 3 is a cross-sectional view taken along line III-III in FIG. 2. Referring to FIG. 3, electrode assembly 112 includes current collecting foils 122 and 126, a positive electrode active material layer 123, a negative electrode active material layer 125, and a separator 124.

Positive electrode active material layer 123 is a layer including a positive electrode active material, a conductive material and a binder, and is formed on a surface of current collecting foil 122. A portion of current collecting foil 122 on which positive electrode active material layer 123 is not formed is provided with a positive electrode tab 120. Similarly, negative electrode active material layer 125 is a layer including a negative electrode active material, a conductive material and a binder, and is formed on a surface of current collecting foil 126. A portion of current collecting foil 126 on which negative electrode active material layer 125 is not formed is provided with a negative electrode tab 121.

Separator 124 is provided to be in contact with both positive electrode active material layer 123 and negative electrode active material layer 125. Positive electrode active material layer 123, negative electrode active material layer 125 and separator 124 are impregnated with an electrolyte.

Figure 4:
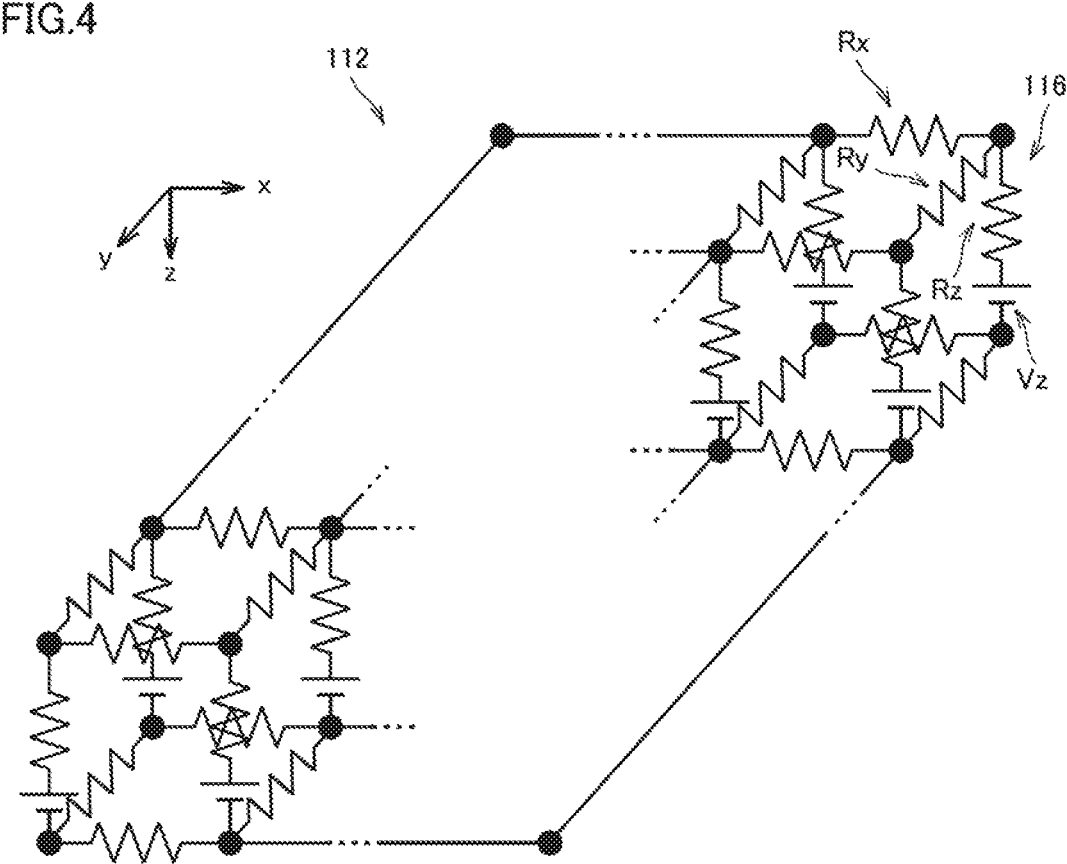
FIG. 4 is a diagram for illustrating an example of a ladder circuit network model.

FIG. 4 is a diagram for illustrating an example of the ladder circuit network model. In FIG. 4, a lateral direction is defined as an x direction, a vertical direction is defined as a z direction, and a depth direction is defined as a y direction.

Referring to FIG. 4, each portion 114 includes a partial structure 116. 20 partial structures 116 are arranged in a matrix form of 4×5 on an x-y plane. Partial structure 116 includes at least a resistance element Rz and a power storage element Vz. One end of resistance element Rz and one end of power storage element Vz are connected in series along the z direction. Partial structure 116 is obtained by modeling a portion of electrode assembly 112 formed of positive electrode active material layer 123 and separator 124.

Partial structure 116 includes resistance elements Rx and Ry, depending on its position. At least one of one end of resistance element Rx and one end of resistance element Ry is connected to each of an upper contact point of the other end of resistance element Rz and a lower contact point of the other end of power storage element Vz. Adjacent partial structures 116 are connected by resistance elements Rx and Ry. These resistance elements Rx and Ry are obtained by modeling a portion of the current collecting foils of electrode assembly 112.

Figure 5:
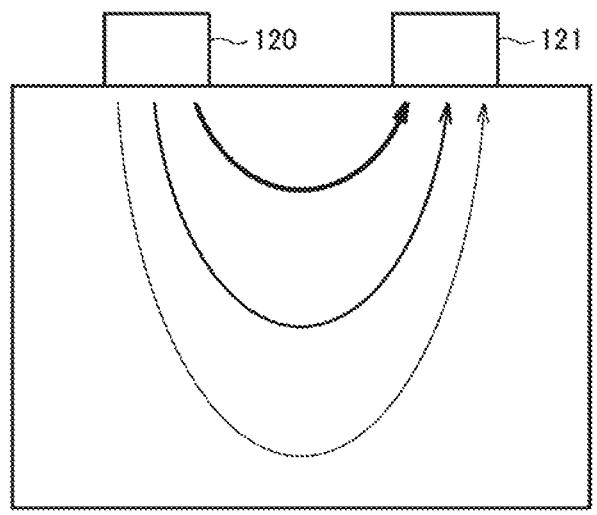
FIG. 5 schematically shows an example of a flow of a current in the cell.

FIG. 5 schematically shows an example of a flow of a current in cell 110. FIG. 5 shows an example of the flow of the current based on the geometric structure of cell 110, and it is assumed that there is no salt concentration unevenness (high rate deterioration) in cell 110.

Referring to FIG. 5, in this example, positive electrode tab 120 and negative electrode tab 121 are formed along the same side in the rectangular electrode assembly. When the current flows from positive electrode tab 120 through the electrode assembly in the cell to negative electrode tab 121, the current flows efficiently along a current route having a short distance between the tabs, and thus, a relatively large current flows along the current route having the short distance between the tabs and a relatively small current flows along a current route having a long distance between the tabs (a thickness of a line indicates the magnitude of the current).

Figure 6:
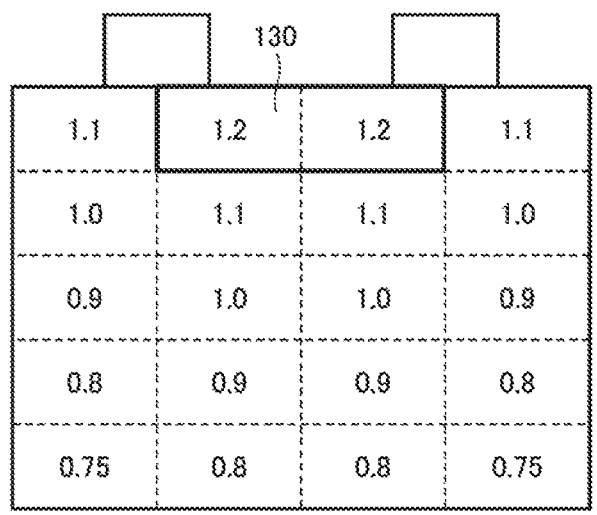
FIG. 6 shows an example of a current distribution in the cell.

FIG. 6 shows an example of the current distribution in cell 110. FIG. 6 shows the normalized magnitude (e.g., a ratio to an average value) of the current in each of 20 portions 114 of electrode assembly 112, and shows that a larger current flows as a numeric value is larger. FIG. 6 also shows an example of the current distribution based on the geometric structure of cell 110, and it is assumed that there is no salt concentration unevenness in cell 110.

Referring to FIG. 6, in this example, the current is maximized in a region 130 including a current route having a relatively short distance between the tabs, not in a central portion of cell 110. The current is relatively small in a portion including a current route having a relatively long distance between the tabs.

As described above, there is current unevenness in the cell, and the current unevenness is greater particularly in a large-sized cell, and thus, it is necessary to control charging and discharging or the like with consideration given to the current distribution in the cell. However, the current distribution in the cell is affected not only by such a geometric structure of cell 110 but also by the salt concentration distribution in the cell.

Figure 7:
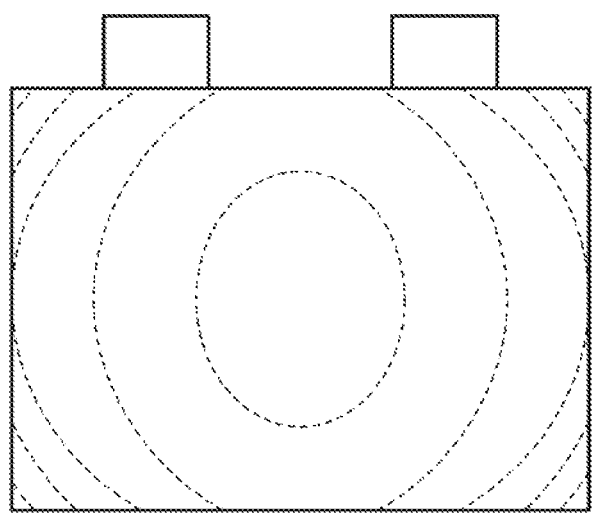
FIG. 7 shows an example of a salt concentration distribution in the cell.

FIG. 7 shows an example of the salt concentration distribution in cell 110. FIG. 7 shows, by way of example, the salt concentration distribution when there is salt concentration unevenness in an excessive discharging state (salt concentration unevenness caused by discharging at a high rate). A dotted line group indicates an iso-salt concentration line, and a salt concentration becomes higher with increasing distance from the center.

Referring to FIG. 7, in the excessive discharging state, the salt concentration increases from a center toward an end of cell 110. In a portion having the increased salt concentration, an internal resistance is relatively high and the current is relatively less likely to flow.

Although not particularly shown, in an excessive charging state (a state in which there is salt concentration unevenness caused by charging at a high rate), the salt concentration increases with decreasing distance from the center of cell 110.

Figure 8:
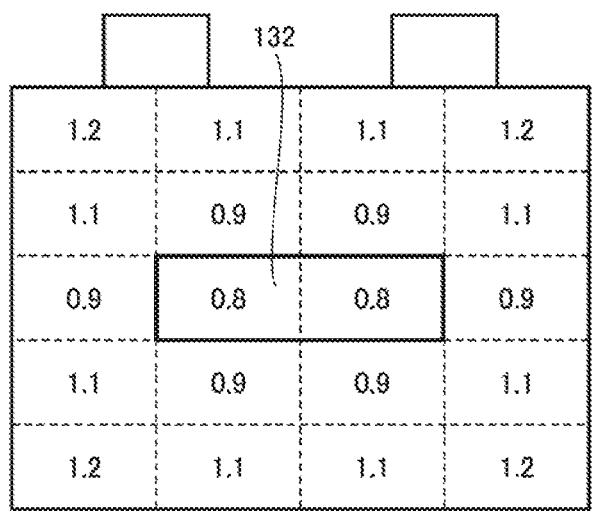
FIG. 8 shows an example of a resistance distribution that occurs in the cell due to salt concentration unevenness.

FIG. 8 shows an example of a resistance distribution that occurs in cell 110 due to salt concentration unevenness. FIG. 8 shows a normalized increase or decrease (e.g., a ratio to an average value) in internal resistance in each of 20 portions 114 of electrode assembly 112 due to salt concentration unevenness, and shows that a resistance is higher as a numeric value is larger. FIG. 8 also shows, by way of example, the resistance distribution when there is salt concentration unevenness in the excessive discharging state.

Referring to FIG. 8, when the salt concentration distribution shown in FIG. 7 occurs, the internal resistance increases from the central portion toward the end of cell 110. That is, the internal resistance is the lowest in a region 132 near the center of cell 110. Therefore, when the salt concentration distribution shown in FIG. 7 occurs, the current becomes less likely to flow with decreasing distance from the end of cell 110, and the current is more likely to flow in the region near the center of cell 110 than in the end of cell 110.

Accordingly, in the present embodiment, in order to take the current unevenness caused by the salt concentration unevenness in cell 110 into consideration, the salt concentration distribution in cell 110 is calculated and the resistance distribution in cell 110 (increase or decrease in internal resistance in each portion) is calculated based on the salt concentration distribution. Specifically, the resistance distribution shown in FIG. 8 is calculated based on the calculated salt concentration distribution.

Figures 9, 10:
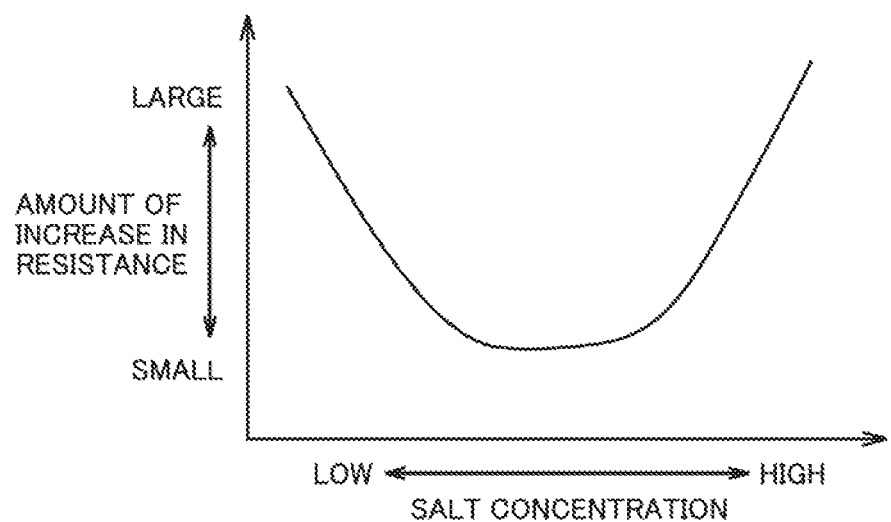
FIG. 9 shows a relationship between the degree of salt concentration and an amount of increase in internal resistance.
FIG. 10 shows an example of a current distribution with consideration given to the salt concentration distribution.

FIG. 9 shows a relationship between the degree of the salt concentration and an amount of increase in internal resistance. Referring to FIG. 9, the amount of increase in resistance becomes larger as the salt concentration becomes higher. When the salt concentration decreases, the amount of increase in resistance also becomes larger.

By standardizing (e.g., a ratio of the salt concentration in each portion 114 to an average value of the salt concentration) the calculated salt concentration distribution, and preliminarily evaluating a relationship between the amount of increase or decrease in salt concentration and the amount of increase in internal resistance by an experiment, simulation or the like to generate a map or a relational equation, the resistance distribution (FIG. 8) in cell 110 can be calculated based on the salt concentration distribution.

Then, in the present embodiment, the resistance distribution calculated based on the salt concentration distribution is applied to the ladder circuit network model. Specifically, the calculated resistance distribution (the normalized amount of increase or decrease in internal resistance) is multiplied by the resistance elements that form the ladder circuit network model, to thereby incorporate the resistance distribution calculated based on the salt concentration distribution into the ladder circuit network model. As a result, the current distribution in cell 110 can be accurately calculated, with consideration given to the geometric structure of cell 110 and the salt concentration distribution in cell 110.

FIG. 10 shows an example of the current distribution with consideration given to the salt concentration distribution. FIG. 10 corresponds to FIG. 6 showing the current distribution with no consideration given to the salt concentration unevenness.

Referring to FIG. 10, in this example, due to an influence of the salt concentration distribution, the current is maximized in a region 134 shown in the figure, not in a region (region 130 in FIG. 6) including a current route having a relatively short distance between the tabs. Therefore, when the current flowing through region 134 exceeds a limiting value, an input and an output to and from battery pack 100 are suppressed to thereby suppress an input and an output to and from cell 110. Thus, cell 110 can be protected from an overcurrent.

Figure 11:
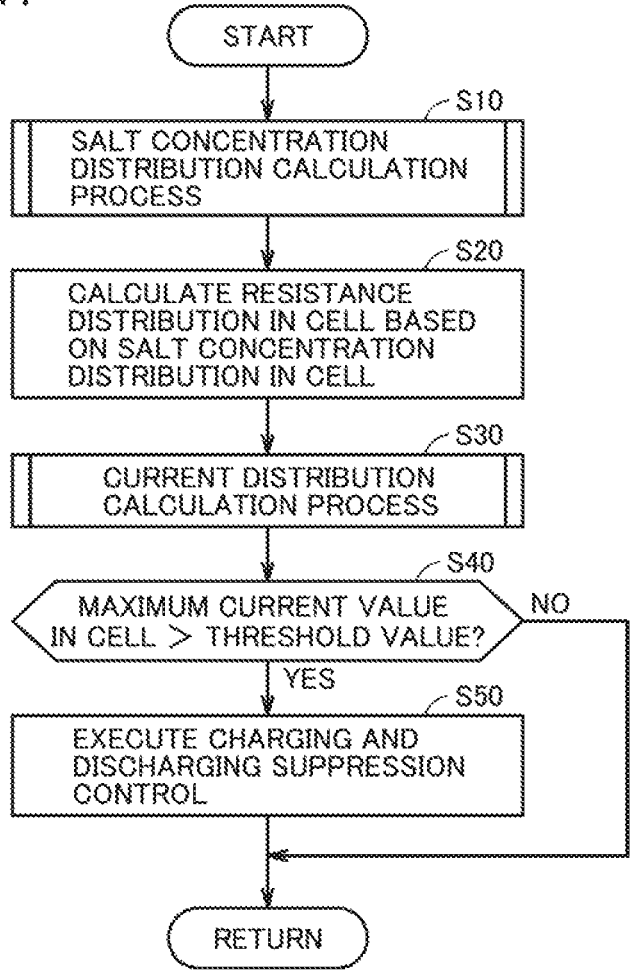
FIG. 11 is a flowchart showing an example of a procedure of a process performed by an ECU.

FIG. 11 is a flowchart showing an example of a procedure of a process performed by ECU 300. The process shown in this flowchart is performed for each cell 110 of battery pack 100, and is repeatedly performed every prescribed cycle while the system of vehicle 1 is active.

Referring to FIG. 11, ECU 300 performs a salt concentration distribution calculation process of calculating a salt concentration distribution in cell 110 to be computed (hereinafter, referred to as "target cell") (step S10). The details of the salt concentration distribution calculation process will be described below.

Next, ECU 300 calculates a resistance distribution in the target cell based on the salt concentration distribution calculated in step S10 (step S20). Specifically, ECU 300 reads, from memory 302, the preliminarily prepared map or relational equation indicating the relationship between the salt concentration and the amount of increase in resistance shown in FIG. 9, and calculates an amount of increase in resistance for each portion 114 of the target cell using the above-described map. The resistance distribution based on the salt concentration distribution thus calculated is reflected in the ladder circuit network model used in a current distribution calculation process described below.

Then, using the ladder circuit network model in which the resistance distribution based on the salt concentration distribution is reflected, ECU 300 performs the current distribution calculation process of calculating a current distribution in the target cell (step S30). The details of the current distribution calculation process will be described below.

When the current distribution in the target cell is calculated in step S30, ECU 300 determines whether or not a maximum current value obtained from the calculated current distribution exceeds a threshold value (step S40). The threshold value is appropriately determined based on the specifications, a preliminary evaluation test or the like of cell 110 so as to prevent an overcurrent from occurring in cell 110.

When it is determined in step S40 that the maximum current value in the target cell exceeds the threshold value (YES in step S40), ECU 300 executes charging and discharging suppression control of suppressing charging and discharging of battery pack 100 (step S50). For example, ECU 300 suppresses charging and discharging of battery pack 100 by reducing a discharging power upper limit value Wout that defines an upper limit of the discharging power of battery pack 100, and a charging power upper limit value Win that defines an upper limit of the charging power of battery pack 100.

When it is determined in step S40 that the maximum current value is equal to or smaller than the threshold value (NO in step S40), ECU 300 moves the process to Return without performing step S50.

Figure 12:
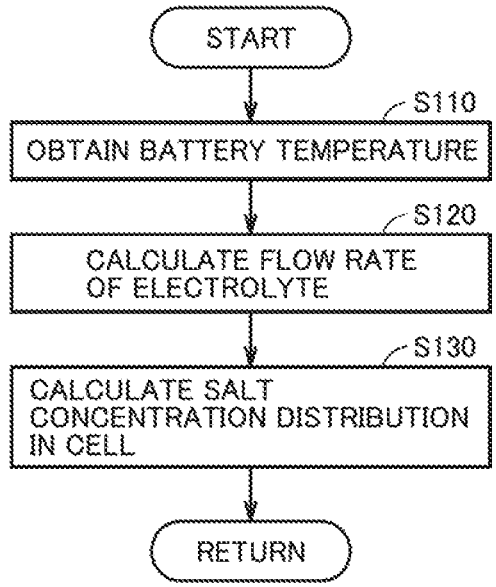
FIG. 12 is a flowchart showing an example of a procedure of a salt concentration distribution calculation process performed in step S10 in FIG. 11.

FIG. 12 is a flowchart showing an example of a procedure of the salt concentration distribution calculation process performed in step S10 in FIG. 11. Referring to FIG. 12, ECU 300 obtains a detection value of temperature Tb of the target cell from temperature sensor 230 (step S110).

Next, ECU 300 calculates a flow rate of an electrolyte in the target cell using obtained temperature Tb (step S120). The flow rate of the electrolyte can be calculated using a known method. For example, Japanese Patent Laying-Open No. 2015-207473 above describes a method for calculating a flow rate of an electrolyte using the following liquid flow equation that is known as the Brinkman-Navier-Stokes equation:

$$\varepsilon_{e,j} \frac{\partial u_s}{\partial t} + \varepsilon_{e,j}(u_j \cdot \nabla)u_j = \frac{1}{\rho}(\mu \nabla^2 u_j - \mu K_j^{-1} u_j - \nabla p) \qquad (1)$$

$$\frac{\partial (\rho \varepsilon_{e,j})}{\partial t} + \nabla \cdot (\rho u_j) = 0 \qquad (2)$$

where $u_j$ represents the flow rate of the electrolyte, $\rho$ represents a density of the electrolyte, $\varepsilon_{e,j}$ represents a volume fraction of the electrolyte, t represents the time, $\mu$ represents a viscosity of the electrolyte, $K_j$ represents a transmission coefficient, and p represents a pressure of the electrolyte. A subscript j is used to make a distinction among a negative electrode plate, a positive electrode plate and a separator, and subscript j includes "n", "p" and "s". When subscript j is "n", subscript j indicates a value about the negative electrode (negative electrode active material layer 125). When subscript j is "p", subscript j indicates a value about the positive electrode (positive electrode active material layer 123). When subscript j is "s", subscript j indicates a value about the separator.

A predetermined fixed value can be used as viscosity μ, or viscosity μ can be changed depending on a temperature of the electrolyte. Temperature Tb detected by temperature sensor 230 is used as the temperature of the electrolyte. By preliminarily preparing information (map or computational equation) indicating a correspondence relation between viscosity μ and temperature Tb by an experiment or the like, viscosity can be specified based on the detection value of temperature Tb.

Density ρ is a parameter that defines expansion and contraction of the electrolyte, and indicates a value corresponding to expansion and contraction of the electrolyte. Expansion and contraction of the electrolyte depends on the temperature (temperature Tb) of the electrolyte, and density ρ also depends on the temperature of the electrolyte. Therefore, by preliminarily preparing information (map or computational equation) indicating a correspondence relation between density ρ and temperature Tb by an experiment or the like, density ρ can be specified based on the detection value of temperature Tb. By specifying density ρ, expansion and contraction of the electrolyte can be grasped. Predetermined fixed values can be used as volume fraction $\varepsilon_{e,j}$ and transmission coefficient $K_j$.

In Equation (1) above, flow rate $u_j$ and pressure p are unknown. Therefore, by defining the continuous equation indicated by Equation (2) and solving a simultaneous equation of Equations (1) and (2), flow rate $u_j$ and pressure p can be calculated. Equations (1) and (2) include density ρ that defines expansion and contraction of the electrolyte, and thus, by solving the simultaneous equation of Equations (1) and (2), flow rate $u_j$ corresponding to expansion and contraction of the electrolyte can be calculated. When flow rate $u_j$ is calculated, convergence calculation can, for example, be performed using Equations (1) and (2). The computation using Equations (1) and (2) is performed every prescribed cycle, and flow rate $u_j$ can be calculated by using, in a current computation, a value calculated in a previous computation.

In the negative electrode, the electrolyte moves in negative electrode active material layer 125. Therefore, flow rate $u_j$ (i.e., flow rate $u_n$) is calculated for each position in negative electrode active material layer 125. Similarly, in the positive electrode, the electrolyte moves in positive electrode active material layer 123. Therefore, flow rate $u_j$ (i.e., flow rate $u_p$) is calculated for each position in positive electrode active material layer 123. In separator 124, the electrolyte moves in separator 124. Therefore, flow rate $u_j$ (i.e., flow rate $u_s$) is calculated for each position in separator 124.

When the flow rate of the electrolyte is calculated in step S120, ECU 300 calculates a salt concentration distribution in the target cell based on calculated flow rate $u_j$ of the electrolyte. The salt concentration distribution can also be calculated using a known method. Japanese Patent Laying-Open No. 2015-207473 above describes a method for calculating a salt concentration distribution using flow rate $\mu_j$, based on the following equation:

$$\frac{\partial(\varepsilon_{e,j}c_{e,j})}{\partial t} + u_j \cdot \nabla \varepsilon_{e,j}c_{e,j} = \nabla(D_{e,j}^{eff}\nabla c_{e,j}) + \frac{1-t_+^0}{F}j_j \quad (3)$$

where $D_{e,j}^{eff}$ represents an effective diffusion coefficient of the electrolyte, and $t_+^0$ represents a transport number of a salt in the electrolyte. F represents a Faraday constant, and $j_j$ represents an amount of a generated salt in the electrolyte per unit volume and unit time.

The first term of the left side of Equation (3) defines a change in salt concentration for a prescribed time period Δt. The second term of the left side defines a change in salt concentration that depends on a flow (flow rate $u_j$) of the electrolyte. In addition, the first term of the right side defines a diffusion state of the salt in the electrolyte. The second term of the right side defines an amount of the generated salt. During discharging of cell 110, the salt is generated in negative electrode active material layer 125, and during charging of cell 110, the salt is generated in positive electrode active material layer 123. By solving Equation (3) above, the salt concentration distribution in cell 110 can be calculated.

Figure 13:
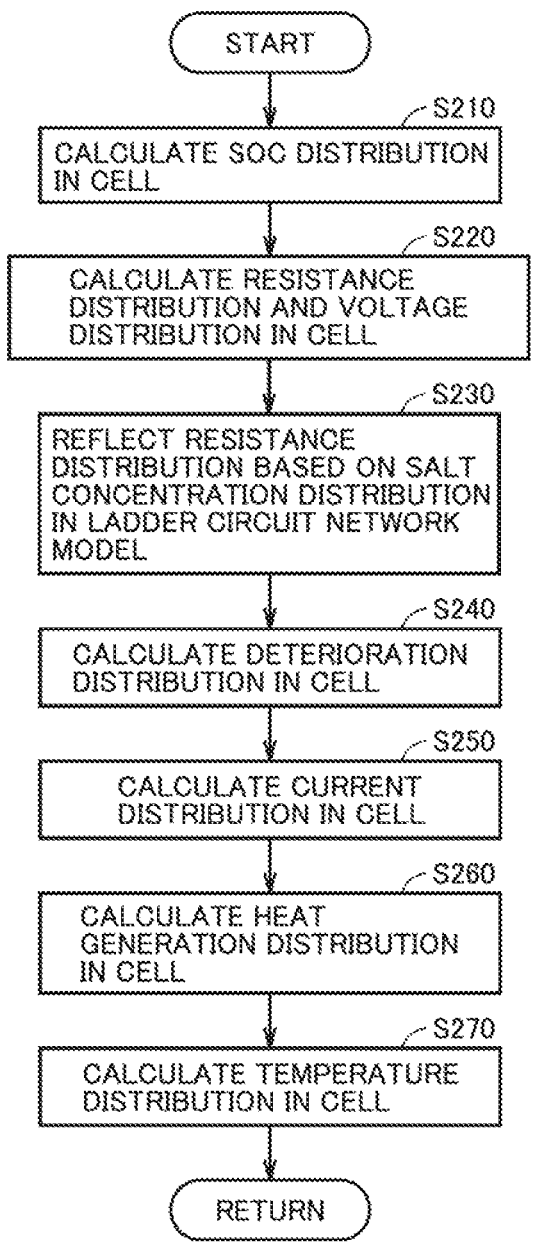
FIG. 13 is a flowchart showing an example of a procedure of a current distribution calculation process performed in step S30 in FIG. 11.

FIG. 13 is a flowchart showing an example of a procedure of the current distribution calculation process performed in step S30 in FIG. 11. Referring to FIG. 13, ECU 300 first estimates an SOC (State Of Charge) distribution in the target cell (step S210). Specifically, ECU 300 calculates the SOC distribution in the target cell by calculating an SOC of power storage element Vz included in each portion (each partial structure 116) of the target cell. ECU 300 calculates the SOC of power storage element Vz included in partial structure 116, using the following equation, for example:

$$SOC_n(t) = SOC_n(t-1) + \frac{I_n(t-1) \times \Delta t}{cap_n \times \Delta Cdeg_n(t-1)} \quad (4)$$

where $SOC_n$ (t) represents an SOC (current value) of power storage element Vz of partial structure 116, and $SOC_n$ (t−1) represents an SOC (previous value) of power storage element Vz. $I_n$ (t−1) represents a current (previous value) flowing through power storage element Vz, and $cap_n$ represents a full charge capacity (initial value) of power storage element Vz. $\Delta Cdeg_n$(t−1) represents a capacity deterioration rate (previous value) of power storage element Vz. The capacity deterioration rate indicates a rate of decrease in full charge capacity of power storage element Vz from an initial value. As the capacity deterioration rate becomes lower than 1, power storage element Vz becomes more deteriorated, and as the capacity deterioration rate becomes closer to 1, power storage element Vz becomes less deteriorated. Δt represents a computation cycle. Various initial values may be set using a result of detection by each sensor.

For example, in the ladder circuit network model shown in FIG. 4, ECU 300 calculates the SOCs (e.g., $SOC_1$ to $SOC_{20}$) of power storage elements Vz of 20 partial structures 116, using Equation (4).

Next, ECU 300 calculates a resistance distribution and a voltage distribution in the target cell (step S220). ECU 300 calculates the resistance distribution in the target cell by, for example, calculating a resistance value of each of resistance elements Rx, Ry and Rz included in the ladder circuit network model (FIG. 4). The resistance values of the plurality of resistance elements included in the ladder circuit network model are preset by, for example, adaptation of a reference value at a reference temperature and a reference SOC by an experiment or the like. The resistance values of the plurality of resistance elements Rx, Ry and Rz included in the ladder circuit network model change in accordance with an amount of deviation from the reference temperature and an amount of deviation from the reference SOC. Therefore, ECU 300 calculates the resistance values of resistance elements Rx, Ry and Rz, using the SOC (current value) of each partial structure 116 and the temperature (previous value) of each partial structure 116. ECU 300 calculates the resistance values of resistance elements Rx, Ry and Rz, using a prescribed map, for example.

Figure 14:
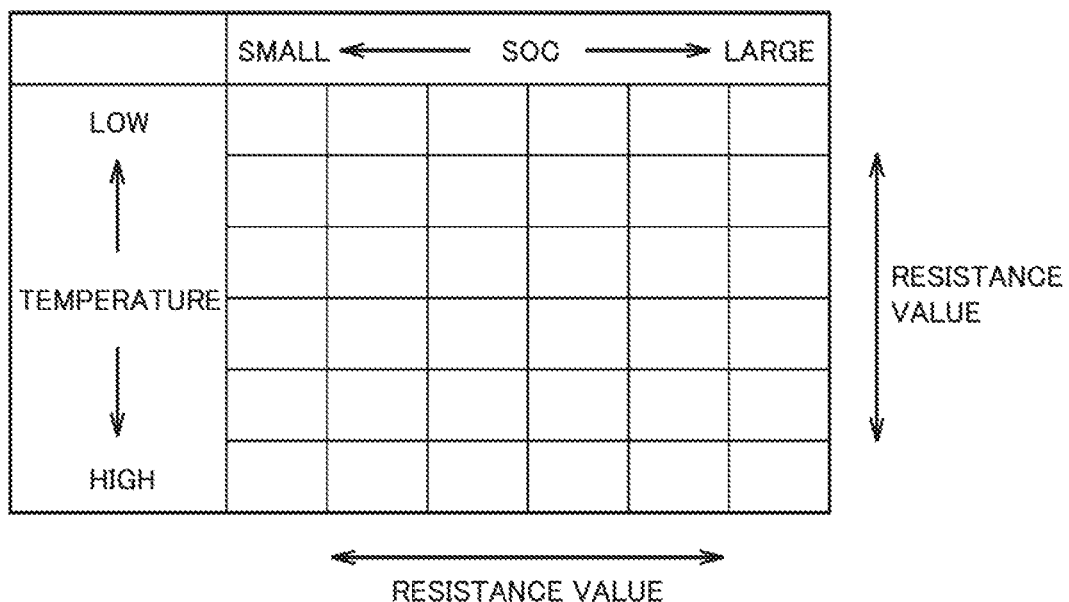
FIG. 14 shows an example of a relationship among a temperature, an SOC, and a resistance value of each resistance element in each partial structure in the cell.

FIG. 14 shows an example of a relationship among the temperature, the SOC, and the resistance value of each of resistance elements Rx, Ry and Rz in each partial structure 116 in cell 110. Referring to FIG. 14, the temperature and the SOC are partitioned into a plurality of regions and the resistance value of each of resistance elements Rx, Ry and Rz corresponding to the temperature and the SOC is set for each partitioned region. ECU 300 calculates the resistance value of each of resistance elements Rx, Ry and Rz included in each partial structure 116, using an SOC (current value) of each partial structure 116, a temperature (previous value) of each partial structure 116, and the map shown in FIG. 14.

ECU 300 multiplies the calculated resistance value of each of resistance elements Rx, Ry and Rz by a resistance deterioration rate (previous value) corresponding to each partial structure 116, to thereby calculate a resistance value (current value) of each of resistance elements Rx, Ry and Rz. The resistance deterioration rate indicates a rate of increase in resistance value of each resistance element from an initial value. As the resistance deterioration rate becomes higher than 1, the resistance element becomes more deteriorated, and as the resistance deterioration rate becomes closer to 1, the resistance element becomes less deteriorated.

Furthermore, ECU 300 calculates the voltage distribution by calculating a voltage of power storage element Vz in each partial structure 116 in the target cell. The voltages of the plurality of power storage elements Vz included in the ladder circuit network model are preset by, for example, adaptation of a reference value at a reference temperature and a reference SOC by an experiment or the like. The voltages of the plurality of power storage elements Vz included in the ladder circuit network model change in accordance with an amount of deviation from the reference temperature and an amount of deviation from the reference SOC. Therefore, ECU 300 calculates the voltage of each power storage element Vz, using the SOC (current value) of each partial structure 116 and the temperature (previous value) of each partial structure 116. ECU 300 calculates the voltage of each power storage element Vz, using a prescribed map, for example. The prescribed map indicates the relationship among the temperature, the SOC and the voltage, similarly to the map indicating the relationship among the temperature, the SOC and the resistance value as shown in FIG. 14, and thus, detailed description thereof will not be repeated.

Next, ECU 300 reflects the resistance distribution in the target cell calculated based on the salt concentration distribution in step S20 in FIG. 11 in the resistance distribution calculated in step S220 (step S230). Specifically, ECU 300 multiplies each resistance element in each partial structure 116 in the ladder circuit network model by the corresponding amount of increase in resistance calculated based on the salt concentration distribution, to thereby correct the value of each resistance element in the ladder circuit network model.

Then, ECU 300 calculates a deterioration distribution in the target cell (step S240). Specifically, ECU 300 estimates a deterioration coefficient distribution, and estimates a deterioration amount distribution using the estimated deterioration coefficient distribution. A deterioration coefficient includes a capacity deterioration coefficient for calculating an amount of deterioration in capacity, and a resistance deterioration coefficient for calculating an amount of deterioration in resistance. ECU 300 calculates the deterioration coefficient distribution by calculating the capacity deterioration coefficient and the resistance deterioration coefficient corresponding to each partial structure 116.

Both the capacity deterioration coefficient and the resistance deterioration coefficient are values that depend on the SOC and the temperature in each partial structure 116 in cell 110. Therefore, ECU 300 calculates the capacity deterioration coefficient and the resistance deterioration coefficient corresponding to each partial structure 116, using the SOC (current value) of each partial structure 116 and the temperature (previous value) of each partial structure 116. ECU 300 calculates the capacity deterioration coefficient and the resistance deterioration coefficient corresponding to each partial structure 116, using a prescribed map, for example.

Figure 15:
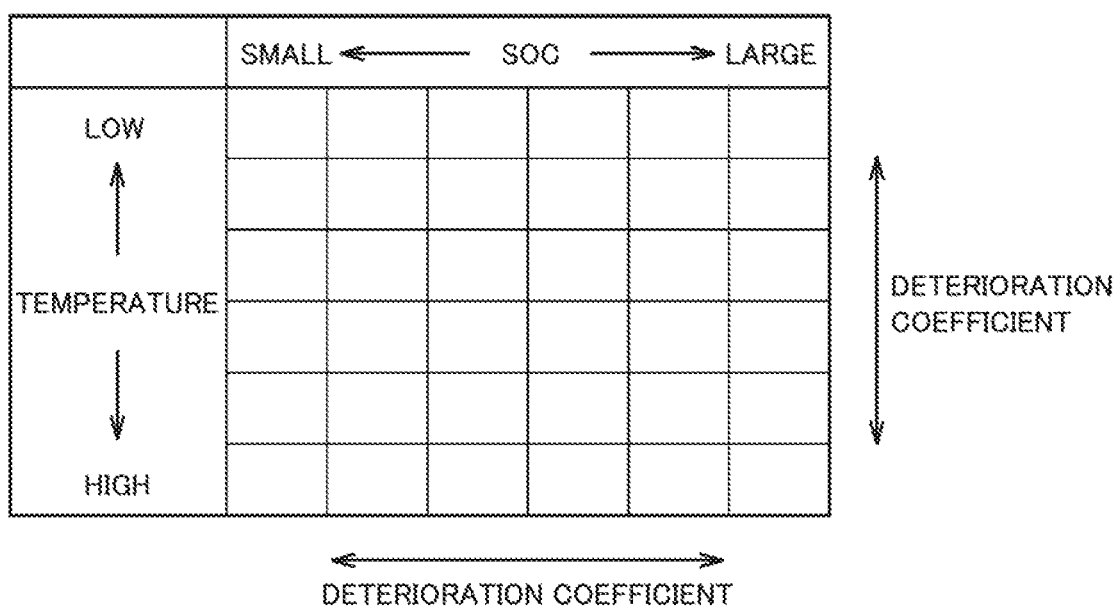
FIG. 15 shows an example of a relationship among a temperature, an SOC and a deterioration coefficient in each partial structure in the cell.

FIG. 15 shows an example of a relationship among the temperature, the SOC and the deterioration coefficient in each partial structure 116 in cell 110. Referring to FIG. 15, the temperature and the SOC are partitioned into a plurality of regions, and the capacity deterioration coefficient and the resistance deterioration coefficient corresponding to the temperature and the SOC are set for each partitioned region. ECU 300 calculates the capacity deterioration coefficient and the resistance deterioration coefficient, using the SOC (current value) of each partial structure 116, the temperature (previous value) of each partial structure 116, and the map shown in FIG. 15.

Then, ECU 300 estimates the deterioration amount distribution using the estimated deterioration coefficient distribution. An amount of deterioration includes an amount of deterioration in capacity indicating an amount of decrease in full charge capacity from an initial value, and an amount of deterioration in resistance indicating an amount of increase in resistance value from an initial value. ECU 300 calculates an amount of deterioration in capacity (current value) corresponding to each partial structure 116, using the calculated capacity deterioration coefficient (current value) corresponding to each partial structure 116 and the amount of deterioration in capacity (previous value). ECU 300 calculates the amount of deterioration in capacity (current value) corresponding to each partial structure 116, using the following equation, for example:

$$\Delta C\,\mathrm{deg}_n(t) = \sqrt{\Delta C \mathrm{deg}_n(t-1)^2 + \Delta t \times C c d_n(t)} \quad (5)$$

where $\Delta C\mathrm{deg}_n(t)$ represents an amount of deterioration in capacity (current value), and $\Delta C\mathrm{deg}_n(t-1)$ represents an amount of deterioration in capacity (previous value). $Ccd_n(t)$ represents a capacity deterioration coefficient (current value). ECU 300 calculates a capacity deterioration rate by, for example, subtracting the calculated amount of deterioration in capacity (current value) from the full charge capacity to thereby obtain a value, and dividing the value by an initial value of the full charge capacity.

Similarly, ECU 300 calculates an amount of deterioration in resistance (current value) corresponding to each partial structure 116, using the calculated resistance deterioration coefficient (current value) corresponding to each partial structure 116 and the amount of deterioration in resistance (previous value). ECU 300 calculates the amount of deterioration in resistance (current value) corresponding to each partial structure 116, using the following equation, for example:

$$\Delta R\deg_n(t) = \sqrt{\Delta R\deg_n(t-1)^2 + \Delta t \times Crd_n(t)} \quad (6)$$

where $\Delta R\deg_n(t)$ represents an amount of deterioration in resistance (current value), and $\Delta R\deg_n(t-1)$ represents an amount of deterioration in resistance (previous value). $Crd_n(t)$ represents a resistance deterioration coefficient (current value). ECU 300 calculates a resistance deterioration rate by, for example, adding the amount of deterioration in resistance (current value) to a reference value of the resistance value of each resistance element to thereby obtain a value, and dividing the value by the reference value of the resistance value of each resistance element.

Referring again to FIG. 13, ECU 300 calculates a current distribution in the target cell (step S250). ECU 300 calculates the current distribution in the target cell by calculating a current flowing through each of resistance elements Rx, Ry and Rz and each power storage element Vz, using the resistance distribution in which the salt concentration distribution is reflected in step S230 and the voltage distribution calculated in step S220.

Figure 16:
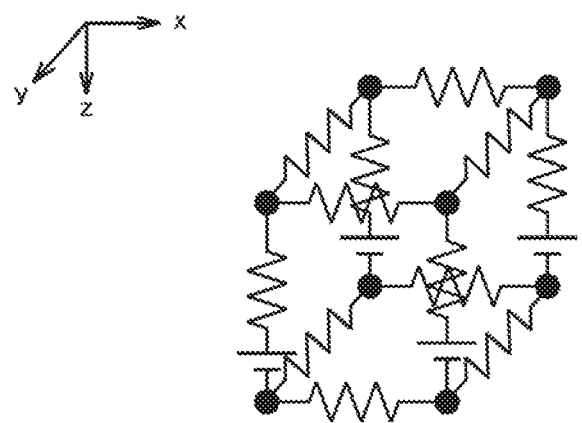
FIG. 16 shows a cubic lattice formed by eight contact points in a part of the ladder circuit network model.
Figure 17:
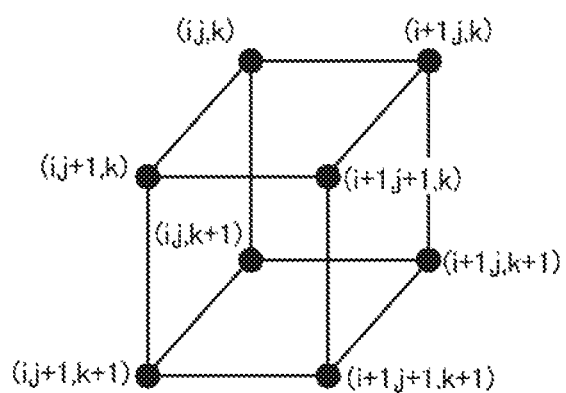
FIG. 17 shows generalized coordinates of the eight contact points of the cubic lattice.
Figure 18:
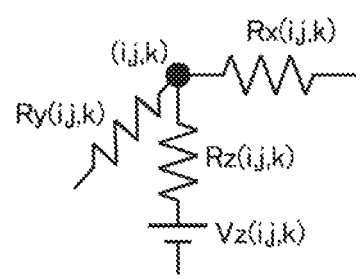
FIG. 18 shows each resistance element and a power storage element connected to a contact point.
Figure 19:
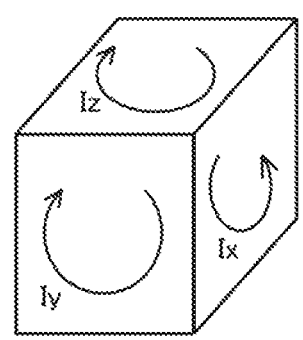
FIG. 19 is a diagram for illustrating loop currents.

An example of a method for calculating the current distribution will be described below with reference to FIGS. 16 to 19, using an extracted part of the ladder circuit network model. FIG. 16 shows a cubic lattice formed by eight contact points in a part of the ladder circuit network model. FIG. 17 shows generalized coordinates of the eight contact points of the cubic lattice. FIG. 18 shows resistance elements Rx (i, j, k), Ry (i, j, k) and Rz (i, j, k) and a power storage element Vz (i, j, k) connected to a contact point (i, j, k). FIG. 19 is a diagram for illustrating loop currents.

The case in which the respective contact points in the cubic lattice shown in FIG. 16 have the coordinates as shown in FIG. 17 is assumed. In this case, as shown in FIG. 18, a resistance element arranged along a positive direction of an x axis with respect to the contact point (i, j, k) is defined as Rx (i, j, k), a resistance element arranged along a positive direction of a y axis with respect to the contact point (i, j, k) is defined as Ry (i, j, k), a resistance element arranged along a positive direction of a z axis with respect to the contact point (i, j, k) is defined as Rz (i, j, k), and the power storage element is defined as Vz (i, j, k).

As shown in FIG. 19, a loop of a current is expressed by an orthogonal coordinate. That is, a current that loops on a y-z plane orthogonal to the x axis is defined as Ix, a current that loops on an x-z plane orthogonal to the y axis is defined as Iy, and a current that loops on an x-y plane orthogonal to the z axis is defined as Iz.

In resistance element Rx (i, j, k), a current that loops from the positive direction side of the z axis, a current that loops from the negative direction side of the z axis, a current that loops from the positive direction side of the y axis, and a current that loops from the negative direction side of the y axis overlap with one another. Therefore, a voltage RxI (i, j, k) of resistance element Rx (i, j, k) is expressed like the following equation:

$$RxI(i,j,k) = Rx(i,j,k) \times (Iz(i,j,k) + Iy(i,j,k) - Iz(i,j-1,k) - Iy(i,j,k-1)) \quad (7)$$

Similarly, in resistance element Ry (i, j, k), a current that loops from the positive direction side of the x axis, a current that loops from the negative direction side of the x axis, a current that loops from the positive direction side of the z axis, and a current that loops from the negative direction side of the z axis overlap with one another. Therefore, a voltage RyI (i, j, k) of resistance element Ry (i, j, k) is expressed like the following equation:

$$RyI(i,j,k) = Ry(i,j,k) \times (Ix(i,j,k) - Iz(i,j,k) - Ix(i,j,k-1) + Iz(i-1,j,k)) \quad (8)$$

Similarly, in resistance element Rz (i, j, k), a current that loops from the positive direction side of the x axis, a current that loops from the negative direction side of the x axis, a current that loops from the positive direction side of the y axis, and a current that loops from the negative direction side of the y axis overlap with one another. Therefore, a voltage RzI (i, j, k) of resistance element Rz (i, j, k) is expressed like the following equation:

$$RzI(i,j,k) = Rz(i,j,k) \times (-Ix(i,j,k) - Iy(i,j,k) + Ix(i,j+1,k) + Iy(i-1,j,k)) \quad (9)$$

Next, considering, as to loop current Iz, the case in which the orientation of the current loop matches the positive direction of the current and the case in which the orientation of the current loop is opposite to the positive direction of the current, the following equation is derived from the Kirchhoff's second law:

$$RxI(i,j,k) + RyI(i+1,j,k) - RxI(i,j+1,k) - RyI(i,j,k) = 0 \quad (10)$$

Furthermore, considering, as to loop current Ix, the case in which the orientation of the current loop matches the positive direction of the current and the case in which the orientation of the current loop is opposite to the positive direction of the current, the following equation is derived from the Kirchhoff s second law:

$$RzI(i,j+1,k) + RyI(i,j,k) - RyI(i,j,k+1) - RzI(i,j,k) = -Vz(i,j,k) + Vz(i,j+1,k) \quad (11)$$

Furthermore, considering, as to loop current Iy, the case in which the orientation of the current loop matches the positive direction of the current and the case in which the orientation of the current loop is opposite to the positive direction of the current, the following equation is derived from the Kirchhoff s second law:

$$RxI(i,j,k) + RzI(i+1,j,k) - RzI(i,j,k) - RxI(i,j,k+1) = Vz(i+1,j,k) - Vz(i,j,k) \quad (12)$$

Based on derived Equations (10) to (12) above, and a relational equation about the current derived using the Kirchhoff s first law that a total sum of currents flowing into a contact point is equal to a total sum of currents flowing out of the contact point, equations whose solutions are the currents flowing through each of resistance elements Rx, Ry and Rz and each power storage element Vz can be set. Such equations are set for each contact point and computational equations that can be computed by ECU 300 to obtain the solutions of these equations are set using the above-described resistance distribution and voltage distribution. Thus, the currents flowing through each of resistance elements Rx, Ry and Rz and each power storage element Vz can be calculated and the current distribution in cell 110 can be calculated. A well-known method may be used as a specific method for obtaining the solutions of the equations, and a method for obtaining a solution using an inverse matrix may, for example, be used.

Referring again to FIG. 13, ECU 300 calculates a heat generation amount distribution in the target cell, using the resistance distribution and the current distribution in the target cell (step S260). Specifically, ECU 300 calculates the heat generation amount distribution in the target cell by, for each partial structure 116, multiplying a square value of the current obtained from the current distribution by the resistance value obtained from the resistance distribution, and calculating an amount of heat generation in each partial structure 116. When partial structure 116 includes a plurality of resistance elements, a sum of amounts of heat generation in the resistance elements may be calculated as the amount of heat generation in partial structure 116.

Next, ECU 300 calculates a temperature distribution in the target cell (step S270). Specifically, ECU 300 calculates an amount of change in temperature ΔT of each partial structure 116 using the following equation:

$$Q = m \times c \times \Delta T - \alpha \times (T - T\_0) \times S \qquad (13)$$

where "Q" represents an amount of heat generation in each portion, and "m" represents a mass of each portion. "c" represents a specific heat, and "a" represents a heat transfer coefficient. "T" represents a temperature (previous value) of each portion, and "T_0" represents a temperature of the air. "S" represents a cross-sectional area of each portion. These numeric values are obtained by, for example, adaptation by an experiment or the like, or detection or estimation using results of detection by various sensors. In Equation (13), "m×c×Δt" represents a heat generation term, and "α×(T−T_0)×S" represents a heat release term.

Then, ECU 300 calculates the temperature distribution in the target cell by, for each partial structure 116, adding the amount of change in temperature ΔT of each partial structure 116 calculated using Equation (13) to a temperature distribution indicating a previous temperature of each partial structure 116, and calculating a current temperature.

The temperature distribution calculated in step S270 is used as a temperature (previous value) in calculation of the resistance distribution and the voltage distribution in step S220.

As described above, in the present embodiment, by calculating the current distribution in cell 110 using the ladder circuit network model, the current distribution caused by the geometric structure of cell 110 can be calculated. Furthermore, the resistance distribution in cell 110 calculated based on the salt concentration distribution in cell 110 is applied to the ladder circuit network model. Therefore, according to the present embodiment, the current distribution in cell 110 can be accurately calculated, with consideration given to the geometric structure of cell 110 and the salt concentration distribution in cell 110.

In addition, according to the present embodiment, the maximum current value in cell 110 can be accurately estimated based on the calculated current distribution, and thus, charging and discharging can be suppressed without excess or deficiency.

It should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A battery system comprising:
   a secondary battery; and
   a controller that calculates a current distribution in the secondary battery using a circuit network model, the circuit network model being obtained by geometrically modeling an interior of the secondary battery using a plurality of resistance elements and a plurality of power storage elements, wherein
   the controller calculates the current distribution by applying, to the circuit network model, a resistance distribution in the secondary battery calculated based on a salt concentration distribution in the secondary battery, and
   the controller executes control of suppressing charging and discharging of the secondary battery, when a magnitude of a current in the secondary battery based on the current distribution exceeds a threshold value.

2. A vehicle comprising the battery system according to claim 1.

3. A method for controlling a battery system including a secondary battery, the method comprising:
   calculating a salt concentration distribution in the secondary battery;
   calculating a resistance distribution in the secondary battery based on the calculated salt concentration distribution;
   calculating a current distribution in the secondary battery using a circuit network model, the circuit network model being obtained by geometrically modeling an interior of the secondary battery using a plurality of resistance elements and a plurality of power storage elements, wherein
   the calculating the current distribution includes calculating the current distribution in the secondary battery using the circuit network model to which the resistance distribution calculated in the calculating the resistance distribution is applied, and
   executing control of suppressing charging and discharging of the secondary battery, when a magnitude of a current in the secondary battery based on the current distribution exceeds a threshold value.

* * * * *